United States Patent [19]

Koide et al.

[11] 4,390,560

[45] Jun. 28, 1983

[54] PROCESS FOR PRODUCING A CREAM CHEESE-LIKE FOOD

[75] Inventors: Kaoru Koide; Yoshiki Yoneda; Kenkichi Musashi, all of Higashimurayama, Japan

[73] Assignee: Meiji Milk Products Company Limited, Tokyo, Japan

[21] Appl. No.: 280,852

[22] Filed: Jul. 6, 1981

[30] Foreign Application Priority Data

Oct. 7, 1980 [JP] Japan ............................ 55-139393

[51] Int. Cl.³ .................... A23C 19/00; A23C 20/00
[52] U.S. Cl. .................................. 426/582; 426/36; 426/585
[58] Field of Search ............... 426/582, 36, 39, 585, 426/519

[56] References Cited

U.S. PATENT DOCUMENTS

| | | |
|---|---|---|
| 3,635,733 | 1/1972 | Kichline et al. ............... 426/582 |
| 3,929,892 | 12/1975 | Hynes et al. .................. 426/36 |
| 4,080,477 | 3/1978 | Tsumura et al. ............... 426/582 |
| 4,329,374 | 5/1982 | Invernizzi et al. ............. 426/582 |

*Primary Examiner*—Raymond N. Jones
*Assistant Examiner*—George C. Yeung
*Attorney, Agent, or Firm*—Browdy & Neimark

[57] ABSTRACT

This invention is relating to a process for producing a cream cheese-like food characterized in that casein, an oil or fat, an emulsifying agent, a calcium salt in an amount of 4–24 mg, preferably 6–15 mg (as calcium) per gram of casein and an orthophosphate are mixed together to obtain a solution, the resulting mixture solution is heated, homogenized, and cooled to obtain a liquid emulsion, then gluconic δ-lactone and rennet are added to the emulsion, the whole is maintained at 15°–55° C., preferably 20°–40° C. to regulate the texture and to attain the equilibrium of the emulsion in the pH range of 5.3–5.9, then a stabilizer, gluconic δ-lactone and necessary additives are added thereto and the whole is pasteurized, charged into containers and cooled.

The method of this invention can continuously make a cream cheese-like food by using a stirring device, homogenizer, transportation line, etc. generally used in the dairy industries.

4 Claims, 2 Drawing Figures

PROCESS FOR PRODUCING A CREAM CHEESE-LIKE FOOD

DETAILED DESCRIPTION OF THE INVENTION

The present invention relates to a process for producing a cream cheese-like food by an industrial, continuous operation.

More particularly, the present invention relates to a process for the mass production of a cream cheese-like food in a manner advantageous for the factory production by preparing a thick emulsion having substantially the same composition as that of cream cheese or Neufchatel cheese and also having a high solid content and a high fat content and then acidifying the same by the addition of gluconic δ-lactone, instead of the lactic acid formation with lactic acid bacteria while the viscosity increase in the fermentation step is controlled and fluidity is maintained over the whole process.

Generally, cream cheese is produced by pasteurizing and homogenizing a fresh cream of a high quality, adding lactic acid bacteria as starter and rennet thereto to effect the fermentation, filtering the thus formed curd by means of a cloth bag or centrifugal separator to remove the whey, then adding common salt and a stabilizer thereto and subjecting the resulting product to the pasteurization, homogenization, charging into containers, and cooling processes to obtain the final product. The cream cheese is expensive, since fresh cream of a high quality is used as the starting material. In addition, the industrial mass production thereof is disturbed by the quite complicated steps such as the fermentation step in which the curd is formed, and the step of removing the whey therefrom. This further elevates the cost of cream cheese.

However, cream cheese matches our recent eating habits and the uses thereof are now increasing over a broad range. For example, it is used domestically or in the confectionery industry as material of cakes and as a garnish for snacks such as biscuits. Thus, the development of an economically advantageous cream cheese-like food has been demanded.

For the purpose of developing a process for the mass production of an inexpensive cream cheese-like food having a texture and flavor very close to those of cream cheese, the inventors have made investigations into the continuous production of a cream cheese-like food. In this process, a whey-removing step and the complicated fermentation step wherein lactic acid bacteria are used are omitted and an emulsion is acidified with gluconic δ-lactone, which is an edible acid. The liquid fluidity is maintained throughout the emulsion-production step, tissue-regulating step and subsequent pasteurization step. A stirring device, homogenizer, transportation line, etc. generally used in the dairy industries for the production of liquid milk, cream, and cheese are combined together and used in this process. After the investigations, the inventors have succeeded in the development of an excellent cream cheese-like food.

1—When aqueous phase and oily phase are mixed together,
2—After the addition of calcium and phosphorus,
3—After the pasteurization but before the homogenization,
4—Immediately after the homogenization,
5—When cooled to 20° C., and
6—When pH 5.6 was attained in the incubation.

Figure 2:
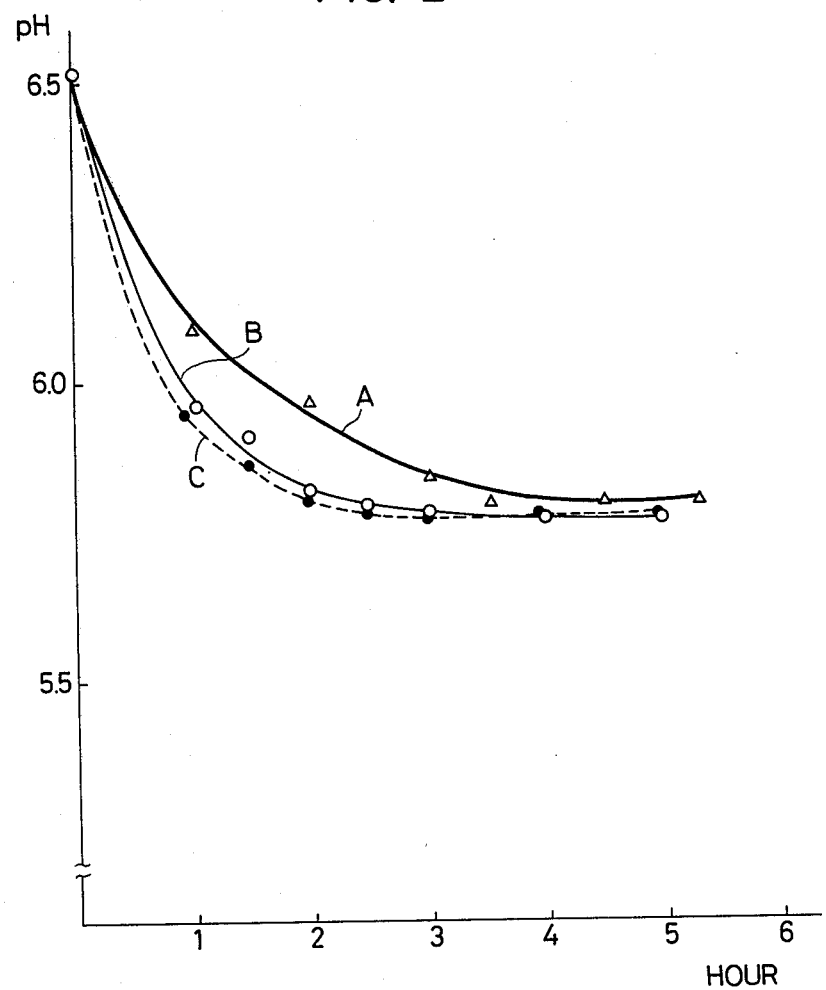

FIG. 2 shows viscosity changes with time during incubation in the presence of gluconic δ-lactone and rennet at a temperatures maintained at 20° C., 35° C. and 40° C.

A—20° C., B—35° C., C—40° C.

The present invention provides a process for producing a cream cheese-like food wherein casein, an oil or fat, an emulsifying agent, a calcium salt, and an orthophosphate are dissolved in water; the resulting mixture solution is pasteurized and homogenized to obtain an emulsion; then rennet is added to the emulsion, the whole is maintained at 15°–55° C. to regulate the texture, said process characterized in that gluconic δ-lactone is added thereto in an amount sufficient for attaining the equiliblium of the emulsion at pH 5.3–5.9, further, a stabilizer, gluconic δ-lactone, and necessary additives are added thereto when the given pH value has been attained, and the whole is pasteurized, charged into a container, and cooled.

In the production operation, according to the present invention, steps in which the viscosity becomes the highest and the fluidity is reduced and thus problems in continuous production are apt to occur are the step of cooling the homogenized emulsion to 15°–55° C., and the step of regulating the texture by the addition of gluconic δ-lactone and rennet. Factors of the viscosity change during the operation were discussed. It has been found that the precipitation occurs if calcium is added in an amount excessive relatively to casein and that it is greatly effective for obtaining a low viscosity at pH 5.3–5.9, in the step of regulating the texture with rennet, to add a calcium salt in an amount in a limited range per unit casein, thereby only partially converting hydrated casein into calcium caseinate.

One of the characteristic features of the present invention is that a calcium salt in an amount of 3–24 mg, preferably 6–15 mg (calculated as calcium), per gram of casein, is added to the previously formed emulsion prior to the homogenization. By this treatment, the low viscosity, i.e. fluidity, can be maintained even if the temperature of the emulsion is lowered to 15°–55° C. or even if the pH is lowered with time during the texture-regulating step.

However, when the pH of the emulsion is lowered to 4.8–5.1, which is an ordinary pH value in the production of cream cheese, the emulsion is rapidly thickened and solidifies. In this case the continuation of the production operation becomes impossible and partial demulsification is apt to occur in the solidified curd.

Figure 1:
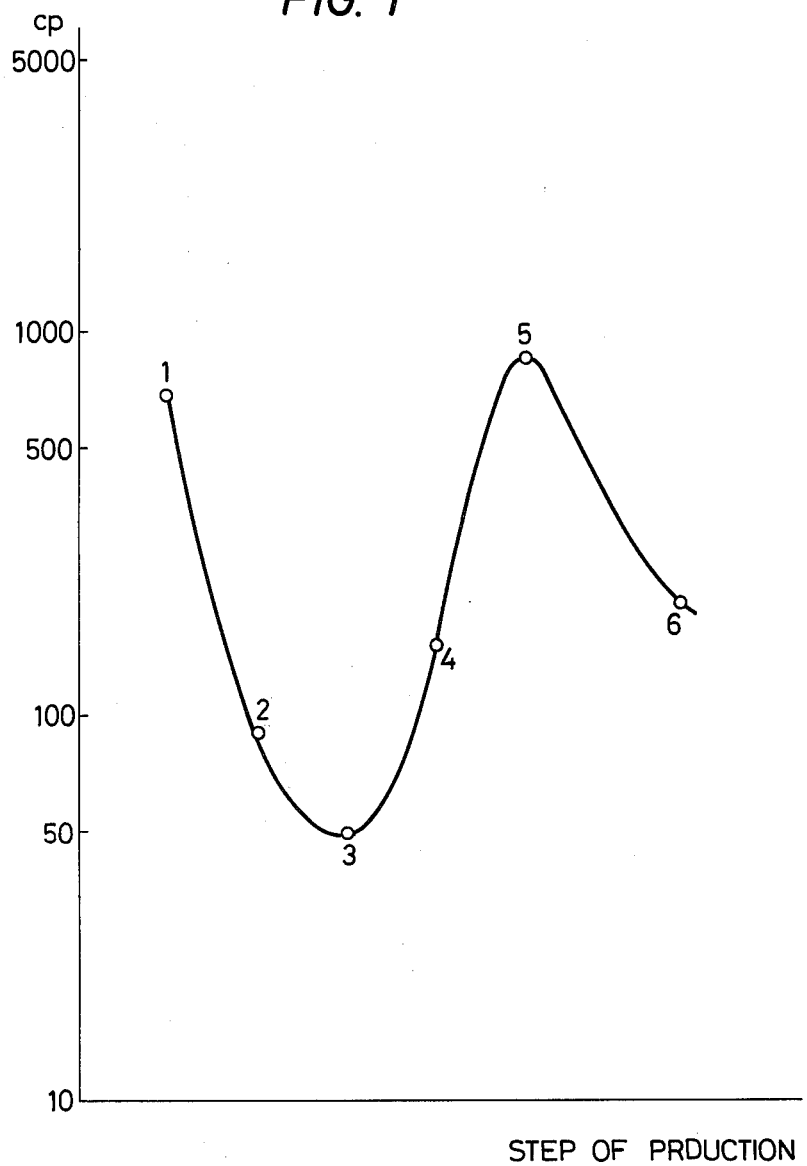
FIG. 1 shows the results of the measurement of viscosity changes in the steps of the production of a cream cheese-like food according to the present invention.

Another characteristic feature of the present invention is that, in the acidification step of the liquid emulsion with gluconic δ-lactone in place of lactic acid bacteria starter, a necessary amount of gluconic δ-lactone is added thereto in two divided portions before the texture-regulating step and before the pasteurization step, whereby the pH is lowered in two stages and the fluidity is maintained throughout the production steps. Gluconic δ-lactone and rennet are added to the thus obtained liquid emulsion and the mixture is maintained at 15°–55° C. for 1.5–6 hours to hydrolyze gluconic δ-lactone into gluconic acid, thereby lowering the pH of the emulsion. Then equilibrium between lactone and gluconic acid is attained and the pH ceases to lower. The final pH of the emulsion varies depending mainly on the amount of gluconic δ-lactone added. The pH lowering rate due to the gluconic acid formation varies, mainly depending on the temperature at which the emulsion is maintained. The amount of the portion of gluconic δ-lactone to be added first, i.e. the amount thereof to be added to the liquid emulsion prepared should be such that the equilibrium is attained at pH 5.3–5.9. The temperature is kept at 15°–55° C., preferably at 20°–45° C. Viscosities of the cream cheese-like food produced according to the present invention vary in the respective step, for example, as shown in FIG. 1. It is apparent from FIG. 1 that the viscosity is about 700 cp (1) when the aqueous phase and the oily phase are mixed together, then reduced to less than 100 cp (2) by the addition of necessary amounts of a calcium salt and a phosphoric acid salt and finally reduced to about 50 cp (3) after completion of the sterilization. After the homogenization by means of a valve homogenizer, a liquid emulsion having a viscosity of about 150–250 cp (4) is obtained. The emulsion is cooled by means of a plate heat exchanger, a jacket stirring tank or a scraper heat exchanger, whereby the viscosity is increased. The emulsion having the composition shown in the examples given below maintains its liquid form with sufficient fluidity in the range of 400–900 cp even at 20° C. (5) Gluconic δ-lactone and rennet are added thereto and the whole is maintained at a suitable temperature. Until a pH of about 5.5 has been attained, the viscosity is reduced to about 150–250 cp as the pH is lowered. At a pH of above about 5.3, it can be treated as a liquid. These viscosities are determined by means of a B-viscometer at 60 rpm. and represented by centipoise.

Still another characteristic feature of the present invention is that gluconic δ-lactone and a stabilizer such as guar gum, locust bean gum, pectin, or starch is added to the thus obtained liquid emulsion of pH 5.3–5.9 and the whole is pasteurized by heating, charged into containers, and cooled, whereby it coheres into a cheese-like curd. Gluconic δ-lactone acts to lower the pH of the emulsion from 5.3–5.9 to 4.6–5.2. The stabilizer is added for the purpose of promoting the emulsification of the fat in the pasteurization to increase the water retention of the product, thereby providing a body like that of the cream cheese after cooling.

In the present invention, casein, an oil or fat, an emulsifying agent, a calcium salt, and an orthophosphate as principal components are dissolved in water to obtain an emulsified mixture. Casein used as the main starting material is selected from the group consisting of lactic casein, sodium caseinate, calcium caseinate, etc. to which a small amount of skim milk powder may be added appropriately. The amount of casein to be used is such that it is contained in the final product in an amount of about 4–15%, preferably about 6–10%. For the oil or fat, butter, butter oil, a vegetable oil or fat, or an animal oil or fat either alone or in the form of a mixture thereof may be used. The amount of the oil or fat to be used is such that it is contained in the final product in an amount of about 15–40%, preferably about 20–35%. The emulsifying agent is suitably selected from the group consisting of monoglycerides, lecithin, and sorbitan/fatty acid esters. They may be used either alone or in the form of a mixture of two or more of them in such an amount that the emulsifying agent is contained in the final product in an amount of about 0.01–0.6%.

The calcium salt is selected from the group consisting of calcium salts such as calcium chloride and calcium hydroxide. The calcium salt is used in such an amount that 4–24 mg, preferably 6–15 mg of calcium is contained per gram of casein in the final product.

If the amount of calcium is insufficient, the partial casein micell formation due to the formation of calcium caseinate is also insufficient, whereby the liquid emulsion has a high viscosity, fat-globules are apt to cohere and cause the fat to float in the course of the fermentation, and the viscosity becomes extremely high at a pH above 5.3, causing problems. If the amount of calcium is excessive, the resulting product is bitter and casein becomes unstable to form precipitates unfavorably.

The orthophosphate is selected from the group consisting of sodium dihydrogenphosphate, potassium dihydrogenphosphate, disodium hydrogenphosphate, dipotassium hydrogenphosphate, etc. The orthophosphate is used in such an amount that about 1.4–28.0 mg, preferably 2.7–14 mg, of phosphorus per gram of casein is contained in the product. If the amount of the orthophosphate is insufficient, the gloss on the surface of the product is lost, the texture does not become sufficiently smooth, and, in addition, a rapid pH lowering sometimes occurs in the fermentation step due to insufficient buffer action, whereby the texture becomes too solid. On the contrary, if the amount of the orthophosphate is excessive, the crispness of the texture becomes poor and an excessively long period of time is required for obtaining a given pH value due to an excessive buffer action in the fermentation.

Since the above calcium and phosphate are contained in considerable amounts in skim milk powder, about 0–47 g of skim milk powder may be used per Kilogram of the product to replace only a part of them with the skim milk powder.

In the present invention, thus obtained emulsion is pasteurized, homogenized and cooled to 15°–55° C. to obtain an emulsion. Gluconic δ-lactone and rennet is added to the emulsion, and it is then maintained at 15°–55° C., preferably 20°–40° C. for 1.5–6 hours. The amount of gluconic δ-lactone to be added first is suitably in the range of 0.3–0.7%. In case rennet is used in the form of 60,000 unit powder, the amount thereof is about 0.1–5.0 mg per Kilogram of the final product.

Even if a given amount of gluconic δ-lactone is added, time required for attaining the equilibrium at pH 5.3–5.9 varies depending on the temperature at which the emulsion is maintained. Once the equilibrium has been attained, the pH will not lower further. Therefore, even if the emulsion is kept in this step for a long period of time for some reasons in the working process or for controlling the working time of the rennet in order to obtain the product of a desirable texture, the fluidity of the emulsion is not lost.

FIG. 2 shows a relationship between the maintenance time and pH lowering rate in a case where 0.5% of gluconic δ-lactone was added. The liquid emulsion having the thus regulated texture is transferred from the fermentation tank into a pasteurization mixing tank through a pipe. Gluconic δ-lactone, a stabilizer and necessary additives are added thereto and the whole is pasteurized at about 80° C., charged into a container, and cooled to obtain a product having a flavor and body very close to those of cream cheese.

Gluconic δ-lactone is thus added again in this step, since it is capable of lowering the pH of the emulsion, which was 5.3–5.9 when the texture-regulation has been completed, to 4.6–5.2 which is the pH value of cream cheese. The stabilizer is selected from the group consisting of locust bean gum, guar gum, carboxymethyl cellulose, crystalline, cellulose, starch, and pectin etc. The stabilizer is used for increasing the viscosity of the emulsion in the cooling step to obtain a texture very close to the texture of cream cheese. The other additives include seasonings such as common salt, thick malt syrup, and flavors.

The following examples further illustrate the present invention.

EXAMPLE 1

An aqueous phase obtained by hydrating and dissolving 12.75 Kg of sodium caseinate and 1.49 Kg of malt syrup powder in 65.32 Kg of water was mixed at 70° C. with an oily phase obtained by dissolving 280 g of a sorbitan fatty acid ester, 1 g of β-carotene and a flavor in 48.28 Kg of a vegetable oil mixture (comprising 70% slightly hydrogenated rape oil and 30% coconut oil) molten by heating.

85.2 g of calcium hydroxide powder, a solution of 333.7 g of calcium chloride dihydrate in 2 Kg of water, and a solution of 53.4 g of disodium hydrogenphosphate dodecahydrate and 32 g of potassium dihydrogenphosphate in 800 g of water were added to the liquid mixture in this sequence. The whole was pasteurized, homogenized and cooled to 30° C. to obtain an emulsion. Then added to emulsion were 700 g of gluconic δ-lactone and a rennet solution (140 mg as powder) and it was maintained at 30° C. for 5 hours to obtain 132 Kg of a liquid acidic emulsion of pH 5.6. The emulsion was mixed with 1,000 g of common salt, 840 g of gluconic δ-lactose, 490 g of guar gum and 2.1 Kg of powdered malt syrup. The mixture was pasteurized by means of a fusing device at 87° C., charged into containers, and cooled to obtain a food having a flavor and a body very close to those of cream cheese.

EXAMPLE 2

An aqueous phase obtained by hydrating and dissolving 25.85 Kg of skim milk powder and 35.75 Kg of sodium caseinate in 248 Kg of water was mixed at 70° C. with an oily phase obtained by dissolving 820 g of lecithin, 820 g of a monoglyceride, 820 g of a sorbitan/fatty acid ester, 4.5 g of β-carotene and a small amount of a flavor in a mixture of 91 Kg of vegetable oil or fat and 91 Kg of butter oil molten by heating.

Then added to the liquid mixture were 165 g of calcium hydroxide and a solution of 313.5 g of calcium chloride dihydrate in 3.85 Kg of water. The whole was pasteurized, homogenized and cooled to 35° C. to obtain an emulsion. Then 2.42 Kg of gluconic δ-lactone and a rennet solution (500 mg as powder) were added to the emulsion and it was maintained at 35° C. for 3.5 hours to effect the texture regulation, thereby obtaining a liquid acidic emulsion of pH 5.6–5.7. The emulsion was mixed with 3.3 Kg of gluconic δ-lactone, 3.86 Kg of common salt, 1.7 Kg of locust bean gum, 8.25 Kg of powdered malt syrup, and 33 Kg of water. The mixture was pasteurized by means of a stirrer provided with a jacket which had large stirring blades in its upper and lower portions, then charged into containers and cooled to obtain a food having a flavor and a body very close to those of cream cheese.

What is claimed is:

1. A process for producing a cream cheese-like food, comprising mixing casein, an oil or fat, an emulsifying agent, a calcium salt in an amount of 3–24 mg, as calcium, per gram of casein and an orthophosphate to obtain a liquid mixture, heating the resulting liquid mixture, homogenizing the heated liquid mixture, cooling the homogenized liquid mixture to obtain a liquid emulsion, adding gluconic δ-lactone and rennet to the emulsion, maintaining the mixture at 15°–55° C. to regulate the texture and to attain the equilibrium of the emulsion in the pH range of 5.3–5.9, then adding a stabilizer and gluconic δ-lactone to the emulsion, pasteurizing the mixture, and charging the pasteurized mixture into containers.

2. The process of claim 1 wherein the casein is selected from the group consisting of lactic casein, sodium caseinate and calcium caseinate and is present in an amount of 4–15%, the oil or fat is selected from the group consisting of butter, butter oil, a vegetable oil, a vegetable fat, an animal fat and mixtures thereof, and is present in an amount of 15–40%, the emulsifying agent is selected from the group consisting of monoglycerides, lecithin, sorbitan, fatty esters, and mixtures thereof, and is present in an amount of 0.01 to 0.6%, the calcium salt is selected from the group consisting of calcium chloride and calcium hydroxide, the ortho phosphate is selected from the group consisting of sodium dihydrogenphosphate, potassium dihydrogenphosphate, disodium hydrogenphosphate and dipotassium hydrogenphosphate, and is present in an amount of from 1.4 to 28.0 mg per gram of casein, the amount of gluconic δ-lactone and rennet added to bring the pH to the range of 5.3 to 5.9 being 0.3 to 0.7% for the gluconic δ-lactone and 0.1 to 5.0 mg per kg for the rennet, all amounts being based on the final product.

3. The process of claim 1 wherein the casein is present in an amount of 6–10%, the oil or fat is present in an amount of 20–35% and the orthophosphate is present in an amount of 2.7–14 mg per gram of casein.

4. The process of claim 1 wherein the calcium salt is present in the range of 6–15 mg per gram of casein.

* * * * *